(12) United States Patent
Fujita et al.

(10) Patent No.: US 7,976,999 B2
(45) Date of Patent: Jul. 12, 2011

(54) FUEL CELL SYSTEM AND METHOD OF CONTROLLING THE SAME FUEL CELL SYSTEM

(75) Inventors: Nobuo Fujita, Toyota (JP); Kimihide Horio, Aichi-gun (JP); Tadaichi Matsumoto, Okazaki (JP); Naohiro Yoshida, Okazaki (JP); Kenji Kurita, Nagoya (JP); Shinya Sakaguchi, Bisai (JP); Hiroaki Mori, Toyota (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 216 days.

(21) Appl. No.: 11/979,613

(22) Filed: Nov. 6, 2007

(65) Prior Publication Data

US 2008/0075992 A1 Mar. 27, 2008

Related U.S. Application Data

(63) Continuation of application No. 10/713,106, filed on Nov. 17, 2003, now Pat. No. 7,354,673.

(30) Foreign Application Priority Data

Nov. 22, 2002 (JP) .................................. 2002-338665

(51) Int. Cl.
*H01M 8/04* (2006.01)
(52) U.S. Cl. ........ 429/433; 429/428; 429/429; 429/436; 429/443; 429/446

(58) Field of Classification Search .................. 429/428, 429/429, 430, 433, 443, 436, 446
See application file for complete search history.

(56) References Cited

U.S. PATENT DOCUMENTS

| | | | |
|---|---|---|---|
| 5,798,186 A | 8/1998 | Fletcher et al. | |
| 5,798,786 A | 8/1998 | Lareau et al. | |
| 6,068,941 A | 5/2000 | Fuller et al. | |
| 6,103,410 A | 8/2000 | Fuller et al. | |
| 6,428,918 B1 * | 8/2002 | Fuglevand et al. | 429/13 |
| 6,727,013 B2 | 4/2004 | Wheat et al. | |
| 6,815,103 B2 * | 11/2004 | Abe et al. | 429/13 |

FOREIGN PATENT DOCUMENTS

| | | |
|---|---|---|
| CN | 1359546 A | 7/2002 |
| EP | 1 291 949 A2 | 3/2003 |
| JP | A-04-010360 | 1/1992 |
| JP | A-11-214025 | 8/1999 |
| JP | A-11-273705 | 10/1999 |
| JP | A-2000-012060 | 1/2000 |
| JP | A-2001-351652 | 12/2001 |
| JP | A-2002-93445 | 3/2002 |
| JP | A-2002-313389 | 10/2002 |
| JP | A 2004-153947 | 5/2004 |
| WO | WO 03/041202 A2 | 5/2003 |
| WO | WO 03/071615 A2 | 8/2003 |

* cited by examiner

*Primary Examiner* — Patrick Ryan
*Assistant Examiner* — Julian Mercado
(74) *Attorney, Agent, or Firm* — Oliff & Berridge, PLC

(57) ABSTRACT

The fuel cell system is provided which detects a freeze among specific components and portions thereof by evaluating various conditions upon starting operation of the fuel cell system. If a freeze is detected through those evaluations, the start of the system is prohibited in order to prevent some deterioration in the fuel cell system.

17 Claims, 8 Drawing Sheets

(NORMAL)

(PARTIALLY FROZEN)

(FROZEN)

(NORMAL)

(PARTIALLY FROZEN)

(FROZEN)

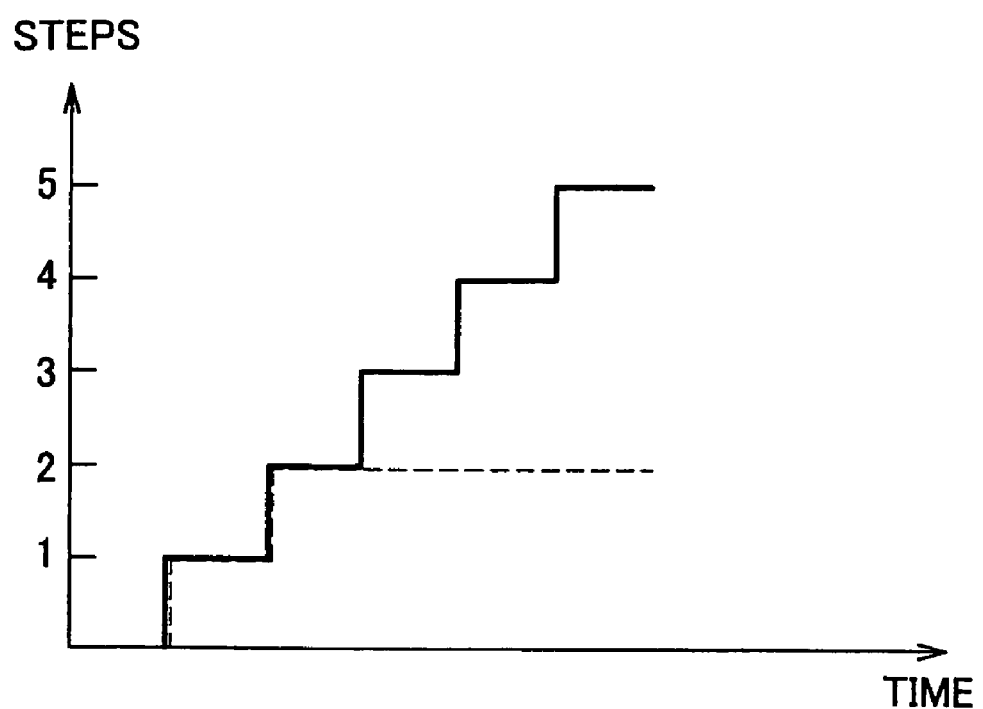
F I G. 8

FUEL CELL SYSTEM AND METHOD OF CONTROLLING THE SAME FUEL CELL SYSTEM

CROSS-REFERENCE TO RELATED APPLICATIONS

This application is a continuation of U.S. patent application Ser. No. 10/713,106 filed Nov. 17, 2003, the disclosure of which is incorporated herein by reference in its entirety.

INCORPORATION BY REFERENCE

The disclosure of Japanese Patent Application No. 2002-338665 filed on Nov. 22, 2002 including the specification, drawings and abstract is incorporated herein by reference in its entirety.

BACKGROUND

1. Field of the Present Invention

The present invention relates to a technology for controlling the start-up of a fuel cell system that generates power through electric chemical reactions between hydrogen and oxygen.

2. Description of the Related Art

Recently, much attention of people has been brought to the fuel cell system enabling power generation through electric chemical reactions between hydrogen and oxygen, as a next generation power source. As is widely known, in the fuel cell system, water is produced from the electric chemical reactions, and such water is usually used for cooling the interior of the fuel cell system or discharged to the outside through a discharge pipe.

However, when such a fuel cell system is placed or used under a low temperature condition where, for example, the outside temperature is below the freezing point, it is considered that water remaining in the valves, pumps, pipes, etc., of the fuel cell system would be frozen, which may make the fuel cell system inoperable or reduce the lifetime of the fuel cell system.

SUMMARY

In view of the above situation, the present invention has been made to provide a fuel cell system capable of avoiding problems resulting from a freeze in the fuel cell system, and a method corresponding to the operation of such a fuel cell system.

A first aspect of the present invention relates to a fuel cell system including a fuel cell, a gas supply-discharge portion for supplying the fuel cell with a gas used in power generation conducted thereby or discharging an exhaust gas from the fuel cell, and controlling means which determines the presence/absence of a freeze among specific portions or components of the fuel cell system including the gas supply-discharge portion at the time of starting up the fuel cell system, and which prohibits the start of the fuel cell system when a freeze is detected in the gas supply-discharge portion even if the portion is only partially frozen.

According to the first aspect of the present invention, it is possible to detect a freeze in a gas supply-discharge potion before starting the operation of the fuel cell system. Thus, the fuel cell system can be prevented from suffering from deterioration which may otherwise be caused when generating power using the fuel cell system in a frozen state, thus avoiding a resultant abnormality or failure in the fuel cell system.

In the fuel cell system according to the first aspect, it is preferable that temperature detecting means be provided to detect a temperature in at least one of the portions or components of the fuel cell system, and the controller be adapted to determine the presence of a freeze if the temperature detected by the temperature detecting means is below a reference value. The temperature detecting means may detect the outside temperature, fuel gas temperature, coolant temperature, and the like. Also, the fuel cell system may be adapted not to make the determination as to the presence/absence of a freeze when the detected temperature is above the reference value. With this arrangement, a delay in the start-up of the fuel cell system can be avoided.

Also, it is preferable that pressure detecting means be provided to detect a pressure at the gas supply-discharge portion and the controlling means determine the presence/absence of a freeze on the basis of the pressure detected by the pressure detecting means. For example, the controlling means may determine that at lease one of the portions or components of the fuel cell system is frozen if a valve for adjusting the supplied or discharged gas amount has been opened and the pressure obtained a predetermined after opening that valve is below a reference valve. Also, it is possible to distinguish between a frozen state and a partially frozen state of the component or portion of the fuel cell system by referring to a change in the pressure. Here, "partially frozen state" refers to a state where the valve is not fully frozen, however the valve shows an abnormal behavior though it is able to operate. In the above case, the detailed location and state of a freeze are able to be determined within the fuel cell system depending upon the position of the valve operated and the pressure sensor.

Also, it is preferable that an electrically driven component for supply or discharge of gas, such as a pressurizing pump, be provided and the controlling means determine the presence/absence of a freeze on the basis of an electric power supplied to the electrically driven component. For example, the controlling means may determine the presence/absence of a freeze through a comparison between a target driven value of the electrically driven component that is indicated by a drive command corresponding to an electric power supplied to the electrically driven component, and the actual driven value obtained during the operation of the electrically driven component. Also, the degree of the freeze may be determined on the basis of the deviation between those values.

Also, it is preferable that when it is determined that the gas supply-discharge portion is not frozen but other component or portion of the fuel cell system is frozen, the fuel cell system be started up and the frozen component or portion be defrosted using at least one of an electric power and heat generated during power generation. During such defrost, other various functions or controls are preferably prohibited or suspended until the defrost ends.

BRIEF DESCRIPTION OF THE DRAWINGS

The foregoing and/or further objects, features and advantages of the present invention will become more apparent from the following description of preferred embodiments with reference to the accompanying drawings, in which like numerals are used to represent like elements and wherein:

FIG. 8 is a graph showing an increase of the number of steps taken for opening a valve in a modification example of the embodiment.

DETAILED DESCRIPTION OF THE PREFERRED EMBODIMENTS

Figure 1:
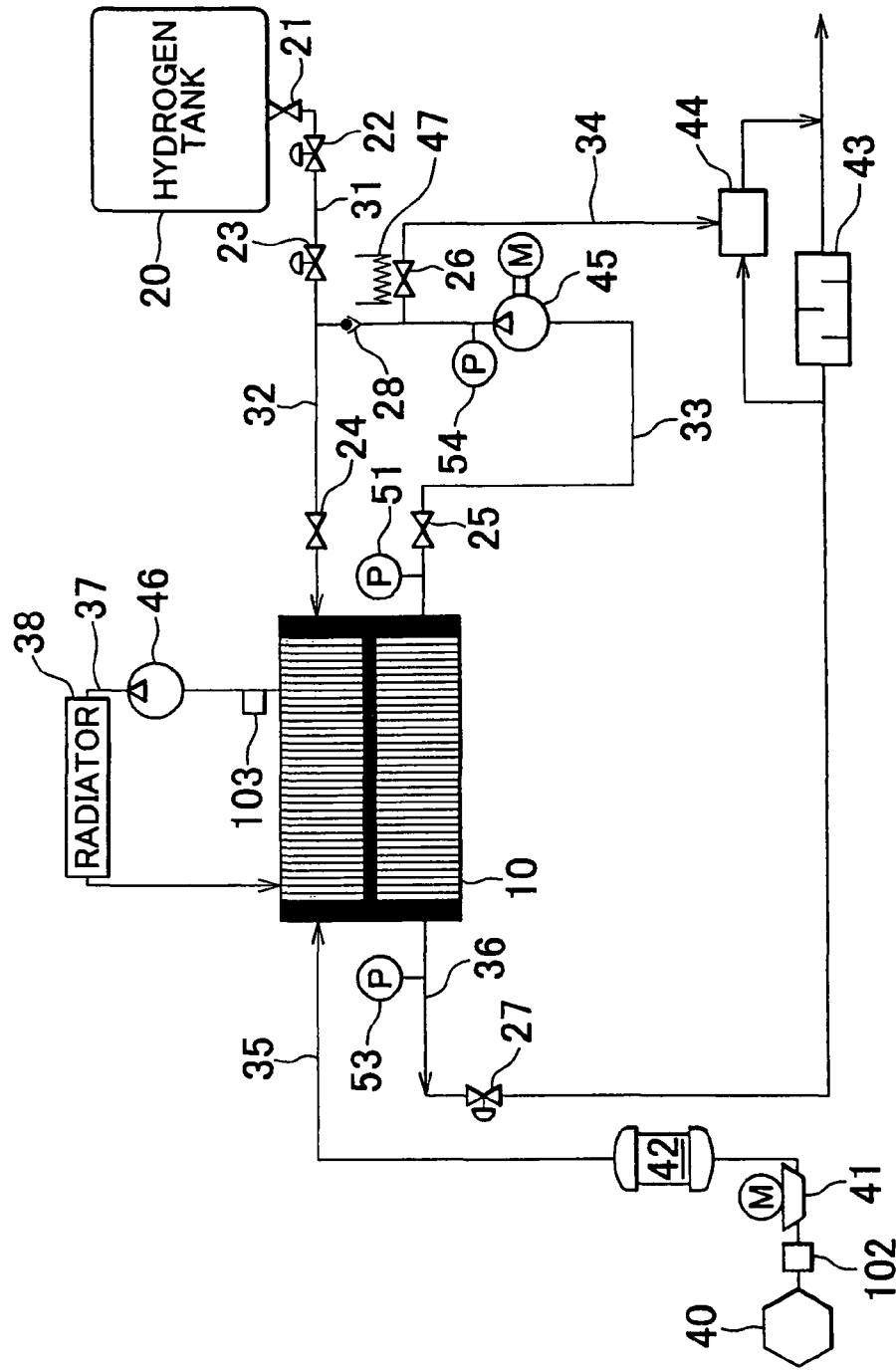
FIG. 1 is a view illustrating the configuration of a fuel cell system according to one embodiment of the present invention.

FIG. 1 is a view illustrating the configuration of a fuel cell system according to one embodiment of the present invention. In this embodiment, the fuel cell system is constructed as a power source for an electric vehicle that runs using a motor. When the driver operates the accelerator, the vehicle conducts power generation and runs using the power generated. Here, it should be noted that an application of the present invention shall not be limited to such an in-vehicle fuel cell system, but it may alternatively be formed as other various types of fuel cell system including a stationary fuel cell system.

Referring to FIG. 1, the fuel cell system includes a fuel cell stack 10 constituted by cells (fuel cells) stacked on the top of another, in each of which power is generated through electric chemical reactions between hydrogen and oxygen. Each cell has a hydrogen-side electrode (i.e., anode) and oxygen-side electrode (i.e., cathode) with an electrolyte membrane interposed therebetween. The electrolyte membrane is a solid polymer electrolyte, such as Nafion membrane (registered trademark), thus each cell is formed as a solid polymer type cell. Needless to say, fuel cells of other various types may alternatively be used in other embodiments.

To the cathode side of the fuel cell stack 10, compressed air is supplied as oxygen containing gas. The air is drawn through a filter 40, and is compressed by a compressor 41. The compressed air is then humidified by a humidifier 42, and is finally brought to the fuel cell stack 10 via a passage 35. Within the passage 35 is disposed a temperature sensor 102 for detecting the intake temperature. Exhaust gas from the cathode side (will hereinafter be referred to as "cathode-off gas") is discharged to the outside via a passage 36 and muffler 43. The supply pressure of air is detected by a pressure sensor 53 disposed in the passage 36, and is adjusted by a regulator valve 27 in accordance with its opening degree.

On the other hand, hydrogen contained in a hydrogen tank 20 is supplied to the anode side of the fuel cell stack 10 via a passage 32. In another embodiment, hydrogen may be produced through reformations of alcohol, hydrocarbon, aldehyde etc., instead of using hydrogen stored in such a hydrogen tank.

Hydrogen is stored in the hydrogen tank 20 while maintained at a high pressure. When supplying hydrogen to the anode side of the fuel cell stack 10, its pressure and amount are adjusted using a shut valve 21, regulator 22, and high-pressure valve 23, which are disposed downstream of an outlet 21 of the hydrogen tank 20. Exhaust gas from the anode side (will hereinafter be referred to as "anode-off gas") is discharged into a passage 33. Also, a pressure sensor 51 and valve 25 for controlling the supply pressure and amount of hydrogen are disposed immediately downstream of the outlet of the fuel cell stack 10 in the anode side thereof.

The passage 33 is separated at an intermediate portion thereof into two passages. One of the passages is connected to a discharge passage 34 for discharging anode-off gas to the outside while the other is connected to the passage 32 via a check valve 28. Since hydrogen is consumed during power generation of the fuel cell stack 10, the pressure of anode-off gas is usually relatively low. Therefore, the fuel cell system includes a hydrogen pump 45 for pressurizing anode-off gas, together with a pressure sensor 54 for detecting the pressure in the vicinity of the outlet of the hydrogen pump 45.

While a discharge valve 26 disposed in the discharge passage 34 is closed, anode-off gas is recirculated into the fuel cell stack 10 via the passage 32, since there remains some unused hydrogen in the anode-off gas. Therefore, recirculating the anode gas enables an effective use of such remaining hydrogen.

During recirculation of anode-off gas, however, extraneous substances (i.e., substances other than hydrogen, such as nitrogen) are not consumed in power generation. Thus, such substances remain in the recirculated gas increasing their concentration as the recirculation goes on. According to the embodiment, therefore, the discharge valve 26 is opened when the concentration of extraneous substances has increased to a certain level, so that the anode-off gas is delivered to a diluter 44 via the discharge passage 34. After diluted in the diluter 44, the anode-off gas is finally discharged to the outside, whereby the recirculated extraneous substances decrease. At this time, however, hydrogen is also discharged together with other substances, and therefore, it is preferable in term of fuel economy that the opening of the discharge valve 26 is set as small as possible. In the vicinity of the discharge valve 26 is disposed a heater 47 for defrosting the discharge valve 26 when it is frozen. The pump 46 uses the power generated by the fuel cell stack 10 or heat generated during the power generation to defrost the valve 26.

As well as hydrogen and oxygen, coolant is also supplied to the fuel cell stack 10. The coolant is delivered to the fuel cell stack 10 by a pump 46 via a passage 37 while being cooled at a radiator 38 disposed along the same passage. Also, a temperature sensor 103 for detecting the temperature of the coolant is disposed at the outlet of the fuel cell stack 10.

Figure 2:
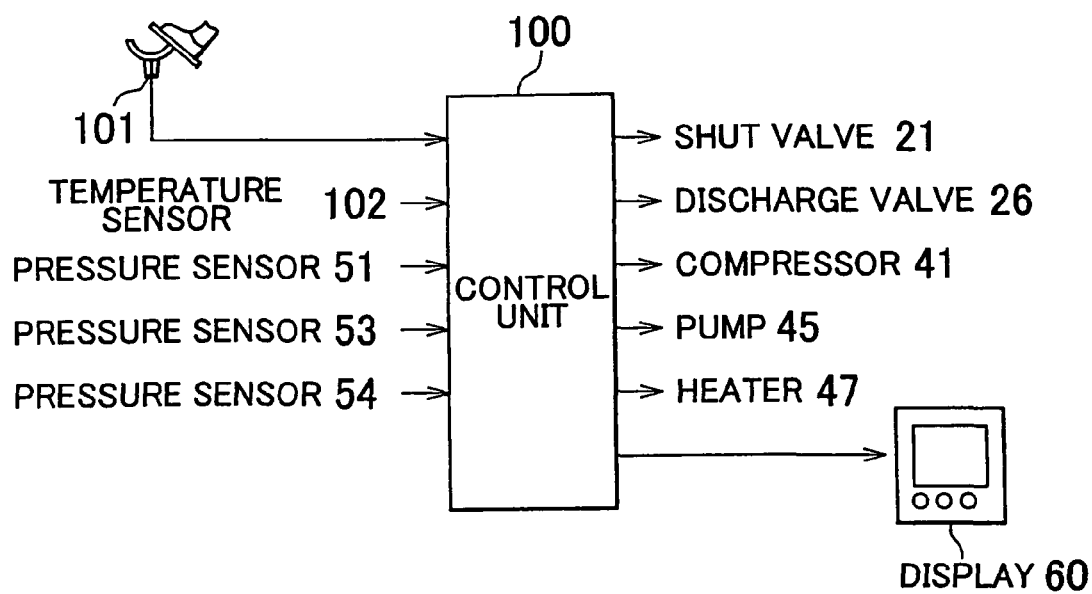
FIG. 2 is a view illustrating the configuration of a control unit and signals input to and output from the same control unit in the embodiment.

FIG. 2 is a view illustrating the configuration of a control unit 100 provided for controlling the fuel cell system. The control unit 100 is a microcomputer device including a CPU, RAM, ROM etc, and controls the operation of the fuel cell system in accordance with programs stored in the ROM. Referring to FIG. 2, each arrow represents signals that the control unit 100 receives from or outputs to each component. For example, these signals include output signals to the shut valve 21, discharge valve 26, compressor 41, hydrogen pump 45, heater 47, and display 60. The display 60 is provided to display a message notifying the user, for example, that the start of the fuel cell system 10 is being prohibited, or the fuel cell system is being defrosted.

Figure 3:
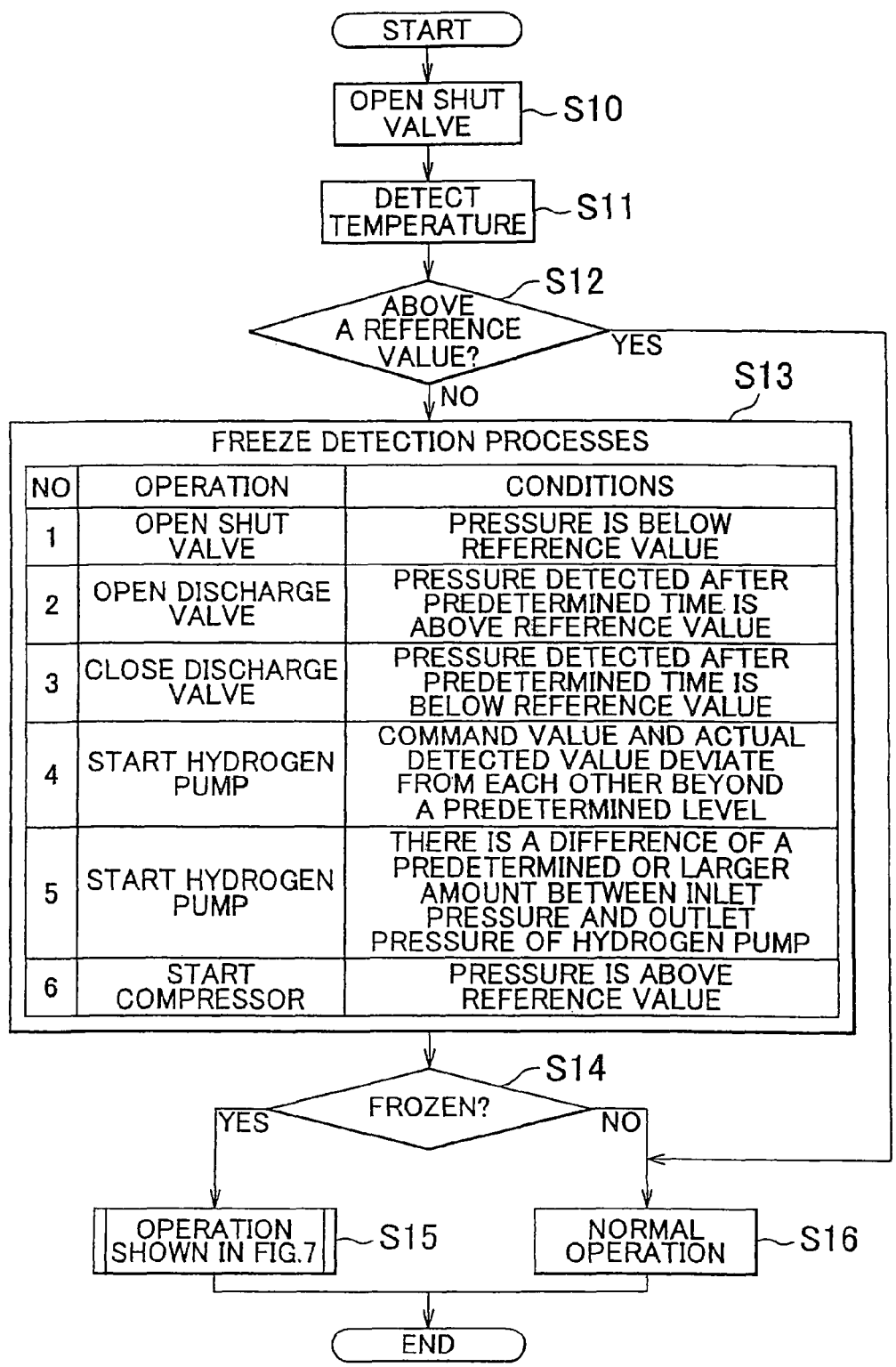
FIG. 3 is a flowchart showing a routine executed by the control unit to determine the presence/absence of a freeze in the fuel cell system according to the embodiment.

FIG. 3 is a flowchart showing a routine executed by the control unit 100 to determine the presence/absence of a freeze in the fuel cell system when the driver performs an operation for starting up the fuel cell system. This routine will hereinafter be referred to as "freeze determination procedure" where appropriate.

When the routine has started, the control unit 100 opens the shut valve 21, regulator 22, high-pressure valve 23, and low-pressure valve 24, so that hydrogen is supplied to the fuel cell stack 10 from the hydrogen tank 20 through the passage 32

(step S10). Then, the control unit 100 reads the outside temperature via the temperature sensor 102 (step S11).

If the outside temperature detected is above a reference value (step S12: YES), the control unit 100 determines that there is no freeze in the fuel cell system. In this case, therefore, the control unit 100 executes a normal start-up operation of the fuel cell system (step S16). For this determination, the control unit 100 may additionally or alternatively refer to the record of the outside temperatures detected via the temperature sensor 102. "Reference value" is equivalent to a temperature that is at least higher than the freezing point of water.

If the outside temperature detected is not above the reference value (step S12: NO), it is highly likely that there is a freeze in the fuel cell system. Thus, the control unit 100 executes a procedure for determining the presence/absence of such a freeze (step S13). In this procedure, five components are operated, and six conditions are evaluated using parameters obtained after or while operating each component to determine the presence/absence of a freeze.

Hereinafter, the evaluations of these conditions will be explained in detail with reference to the table shown in the box of step S13. First, to evaluate the first condition, the control unit 100 obtains the pressure via the pressure sensor 51 a predetermined time after the shut valve 21 has been opened. When there is no freeze in the fuel cell system, the pressure increases due to hydrogen gas supplied. In this evaluation, therefore, if the obtained pressure is below the reference value, the control unit 100 determines that there is a freeze in the fuel cell system. In this case, it is conceivable that one or more of the shut valve 21, regulator 22, high-pressure valve 23, low-pressure valve 24 etc., is frozen.

Next, the control unit 100 evaluates the second condition by opening the discharge valve 26. When the discharge valve 26 is thus opened, anode-off gas is discharged to the outside via the discharge passage 34 and the diluter 44, so that the pressure around the discharge valve 26 decreases. In this evaluation, therefore, the control unit 100 obtains the pressure via the pressure sensor 54 a predetermined time after the discharge valve 26 has been opened. If the obtained pressure is above a reference value, the control unit 100 determines that there is a freeze in the fuel cell system. In this case, it is conceivable that one or more of the discharge valve 26, discharge passage 34, etc., is frozen.

Figure 4A:
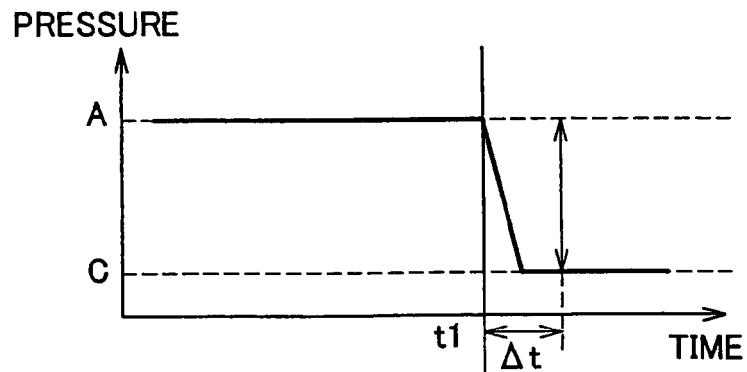
FIGS. 4A to 4C are graphs illustrating changes in the pressure under each state in the embodiment.
Figure 4B:
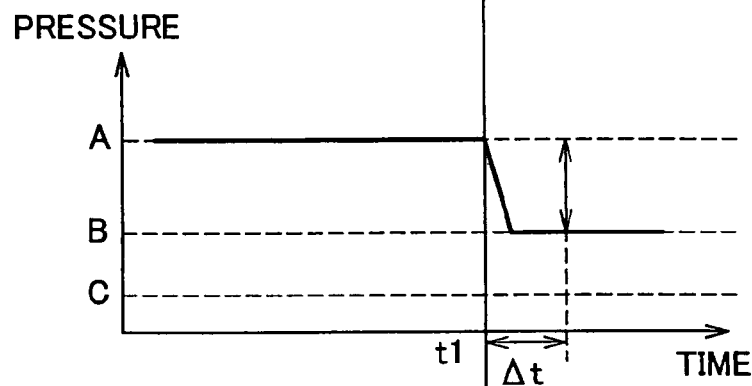
Figure 4C:
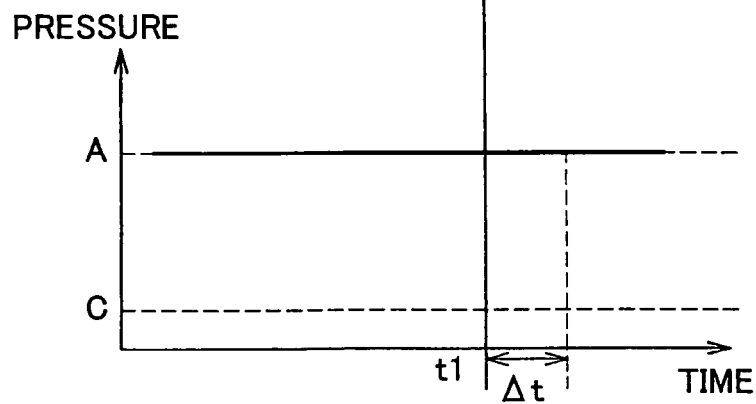

FIGS. 4A to 4C are graphs illustrating changes in the pressure after the discharge valve 26 has been opened under each state. That is, FIG. 4A refers to a normal state (i.e., non-frozen state), FIG. 4B refers to a partially frozen state, and FIG. 4C refers to a frozen state. In each graph, the ordinate represents pressure and the abscissa represents time, and the vertical line having arrowheads at both ends indicates the amount of change in the pressure that is detected by the pressure sensor 54 at a time Δt after the discharge valve 26 has been opened.

During the normal state, referring to FIG. 4A, the pressure starts decreasing upon opening the discharge valve 26, and reaches and stabilizes at the level C. This indicates that the discharge valve 26 has been opened and anode-off gas has been discharged to the outside. During the partially-frozen state, referring to FIG. 4B, the pressure starts decreasing upon opening the discharge valve 26 as in the normal state mentioned above, however it stops decreasing at the level B that is higher than the level C. This indicates that the discharge valve 26 is partially frozen, and therefore it is not fully opened so that a smaller amount of anode-off gas than the normal state described above is discharged. During the frozen state, referring to FIG. 4C, the pressure does not change from the level A. This indicates that the discharge valve 26 is frozen, and therefore it remains closed allowing no anode-off gas to be discharged to the outside. In this way, it is possible to determine the presence/absence of a freeze in the fuel cell system by referring to the pressure detected a predetermined time after the discharge valve 26 has been opened.

Back to FIG. 3, to evaluate the third condition, the control unit 100 then closes the discharge valve 26 to stop the discharge of anode-off gas and thus increase the pressure. In this evaluation, the control unit 100 obtains the pressure via the pressure sensor 54 a predetermined time after the discharge valve 26 has been closed. If the obtained pressure is below a reference value, the control unit 100 determines that there is a freeze in the fuel cell system. In this case, for example, it is conceivable that the discharge valve 26 is frozen.

Figure 5A:
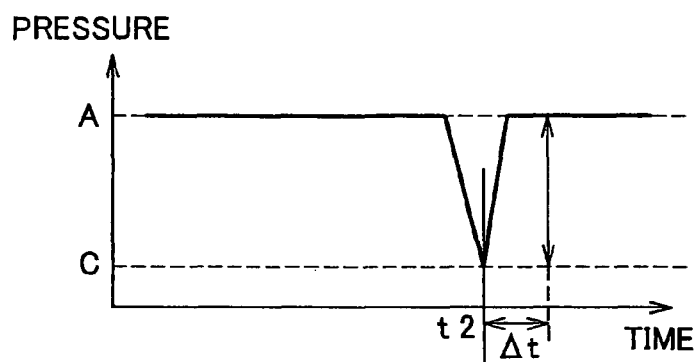
FIGS. 5A to 5C are graphs illustrating changes in pressure under each state in the embodiment.
Figure 5B:
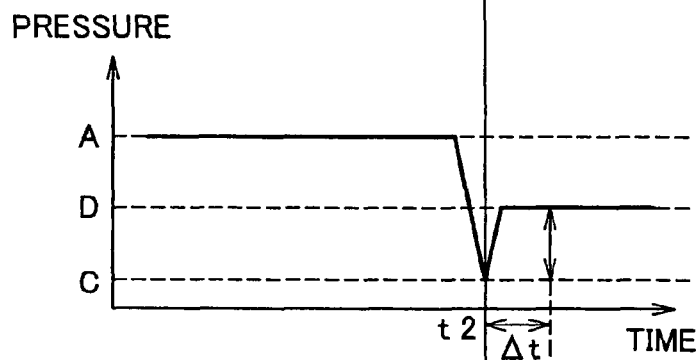
Figure 5C:
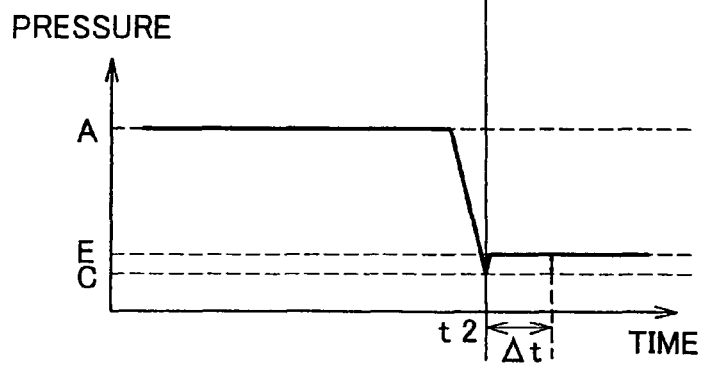

FIGS. 5A to 5C are graphs illustrating changes in pressure after the discharge valve 26 has been closed under each state. That is, FIG. 5A refers to a normal state (i.e., non-frozen state), FIG. 5B refers to a partially frozen state, and FIG. 5C refers to a frozen state. In each graph, the ordinate represents pressure and the abscissa represents time, and the vertical line having arrowheads at both ends indicates the amount of change in the pressure that is detected by the pressure sensor 54 at a time Δt after the discharge valve 26 has been opened. According to this freeze determination procedure, this evaluation as to the third condition is only made if no freeze is detected through the second condition evaluation aforementioned.

During the normal state, referring to FIG. 5A, the pressure starts increasing from the level C upon closing the discharge valve 26, and reaches and stabilizes at the level A. This indicates that the discharge valve 26 has been closed and the discharge of anode-off gas has been stopped. During the partially frozen state, referring to FIG. 5B, the pressure starts increasing from the level C upon closing the discharge valve 26 as in the normal state mentioned above, however it stops increasing at the level D. Here, "partially-frozen state" refers to a state where the discharge valve 26 is partially frozen, and therefore it is not fully closed due to icing, or the like. In this state, anode-off gas is partially discharged to the outside, and therefore, the amount of increase in the pressure is smaller than the normal state described above. During the frozen state, referring to FIG. 5C, the pressure only increases from the level C to the level E that is almost the same level. This is because, as in the partially frozen state described above, ices are formed at the opening/closing portions of the discharge valve 26, and therefore it remains open even when receiving a control signal for closing the discharge valve 26 from the control unit 100. Thus, anode gas is discharged to the outside so that the pressure hardly increases. Accordingly, it is possible to determine the presence/absence of a freeze in the fuel cell system by referring to the pressure detected a predetermined time after the discharge valve 26 has been closed.

Figure 6:
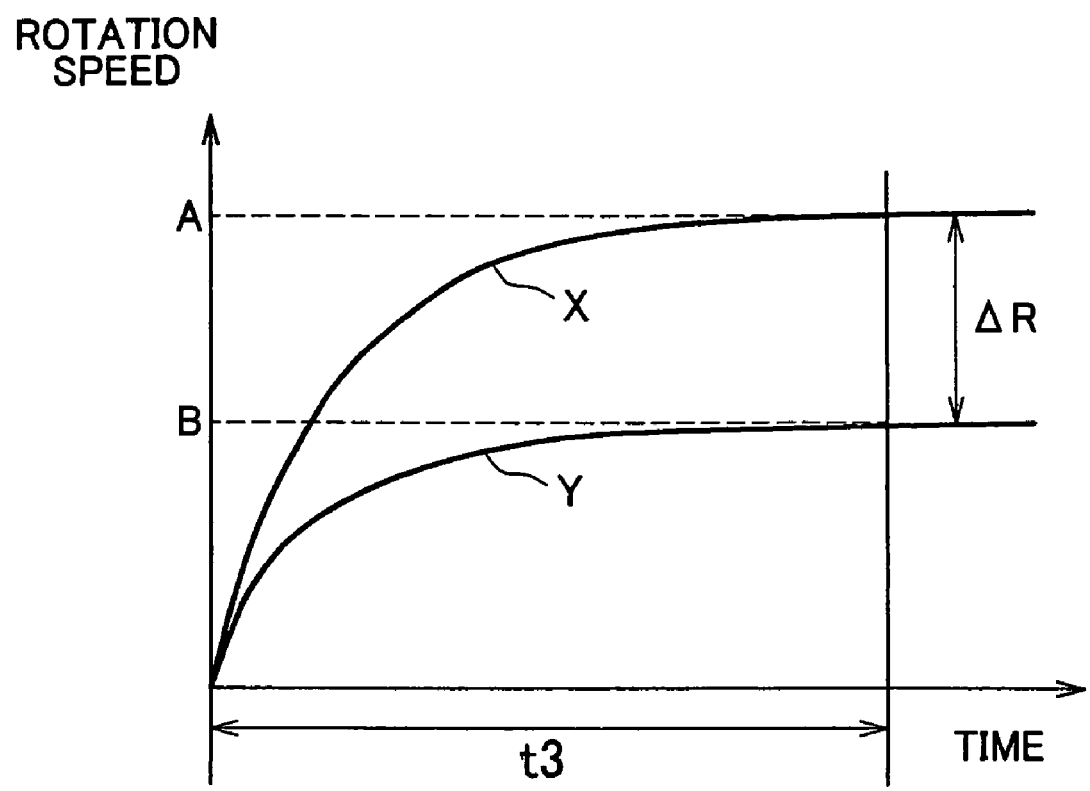
FIG. 6 is a graph illustrating changes in the rotation speed of a hydrogen pump under each state in the embodiment.

Back to FIG. 3, to evaluate the fourth condition, the control unit 100 then starts the hydrogen pump 45 to pressurize anode-offgas. In this evaluation, the control unit 100 determines whether a commanded rotation speed of the hydrogen pump 45 and its rotation speed actually detected deviate from each other beyond a predetermined level. If yes, the control unit 100 determines that there is a freeze in the fuel cell stack 10. In this case, for example, it is conceivable that the hydrogen pump 45 is frozen. FIG. 6 is a graph illustrating changes in the rotation speed of the hydrogen pump 45 under each state.

More specifically, this graph shows changes in the rotation speed of the hydrogen pump 45 observed during time t3 after the control unit 100 has issued a command for starting the hydrogen pump 45. The ordinate represents the rotation speed and the abscissa represents time. Referring to FIG. 6, the curve X represents a commanded rotation speed of the hydrogen pump 45, namely which is a target rotation speed indicated by a command signal output from the control unit 100 to the hydrogen pump 45. Meanwhile, the curve Y represents the actual rotation speed of the hydrogen pump 45. If the hydrogen pump 45 is frozen, the actual rotation speed is still at the level B when it is detected time t3 after the hydrogen pump 45 has stared whereas the commanded rotation speed at this time is equivalent to the level A. This indicates that the hydrogen pump 45 is frozen, and the rotation of the hydrogen pump 45 is hindered by ice adhered thereto. In this way, it is possible to determine the presence/absence of a freeze in the fuel cell system by referring to the difference ΔR between the commanded rotation speed and actual rotation speed of the hydrogen pump 45.

Back to FIG. 3, to evaluate the fifth condition, the control unit 100 again uses the hydrogen pump 45. That is, the control unit 100 starts the hydrogen pump 45 to pressurize anode-off gas, and determines if there is a freeze in the fuel cell system on the basis of the difference between the inlet pressure and outlet pressure of the hydrogen pump 45, which are obtained after the anode-off gas has been pressurized as aforementioned. At this time, the control unit 100 obtains the inlet pressure via the pressure sensor 51 and the outlet pressure via the pressure sensor 54. If the difference between those pressures is of an amount that is equal to or larger than a reference value (amount), the control unit 100 then determines that there is a freeze in the fuel cell system. In this case, for example, it is conceivable that the check valve 28 is frozen. Namely, after pressurized by the hydrogen pump 45, the anode-off gas is adjusted at the check valve 28 so that it flows into the passage 32 during a normal state (i.e., non-frozen state). However, if the check valve 28 is frozen, the anode-off gas does not flow into the passage 32 so that the outlet pressure of the hydrogen pump 45 becomes high.

Next, to evaluate the sixth condition, the control unit 100 starts the compressor 41 to supply compressed air to the fuel cell stack 10, and obtains the pressure of the supplied air via the pressure sensor 53. If the obtained pressure is above a reference value, the control unit 100 then determines that there is a freeze in the fuel cell system. In this case, for example, it is conceivable that the regulator valve 27 is frozen. The regulator valve 27 serves to regulate the supply pressure of air passing through the passage 36 so as to maintain it at a certain level. Therefore, when the pressure obtained via the pressure sensor 53 is above the reference value, it indicates that the regulator valve 27 is frozen, and therefore the regulation of the supplied pressure is not performed properly.

If the control unit 100 does not detect any freeze through the evaluations described above (step S14: NO), the control unit 100 performs a normal operation (step S16). If the control unit 100 has detected any freeze (step S14: YES), conversely, the control unit 100 performs the following operation.

Figure 7:
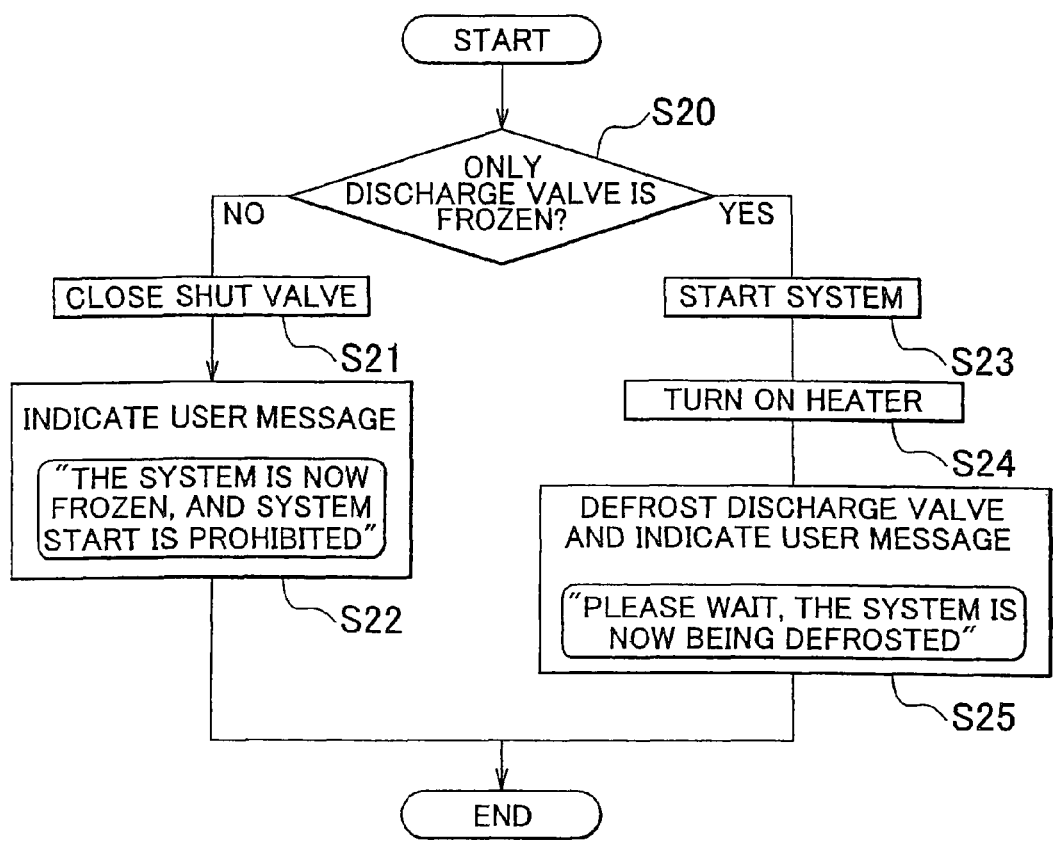
FIG. 7 is a flowchart showing a routine executed by the control unit 100 when a freeze has been detected in the embodiment.

FIG. 7 is a flowchart showing a routine corresponding to the operation performed by the control unit 100 when a freeze has been detected in the above-described procedure. In this routine, if it is determined in step S14 that there is a freeze in the fuel cell system, the control unit then determines whether only the discharge valve 26 is frozen (step S20).

If yes, the control unit 100 starts up the fuel cell system (step S23) because there is no influence to the supply of air and hydrogen to the fuel cell stack 10 until the concentration of extraneous substances increases to a certain level. Subsequently, the heater 47 is turned on using power generated by the fuel cell system to defrost the discharge valve 26 (step S24). At this time, the heat generated through the power generation by the fuel cell system may also be used to defrost the discharge valve 26. During the defrost, the control unit 100 shows a message, as shown in FIG. 7, in the display 60 to notify the user that the system is now being defrosted(step S25).

Meanwhile, if it is determined in step S20 that other component or portion of the fuel cell system is frozen, the control unit 100 closes the shut valve 21 that has been opened in step S10 to stop the supply of hydrogen (step S21), and prohibits that the fuel cell system starts up while showing a message for notifying the user the prohibition of system start in the display 60 (step S22). This is because when a component or portion other than the discharge valve 26 is frozen, it would cause some influence to the supply of air and hydrogen to the fuel cell stack 10. If the fuel cell system in this state were started, therefore, there would be a high possibility of some deterioration in the fuel cell system. In this case, therefore, it is preferable to prohibit the start of the fuel cell system.

According to the above embodiment of the present invention, it is possible to determine the presence/absence of a freeze in the fuel cell system before starting its operation, and the start-up of the fuel cell system is controlled depending on which component or portion of the fuel cell system is frozen so as to avoid deterioration in the fuel cell system. Also, as the precondition for executing the above freeze determination procedure, the outside temperature is detected beforehand, and if the detected outside temperature is a temperate with which there is almost no possibility of a freeze, the fuel cell system is then started without executing any further processes for detecting a freeze, so that no delay is caused during the start-up of the fuel cell system. Furthermore, the message for notifying the user the execution of defrost, or the like, is shown in the display so that the user confirms that it is not a failure of the system. This feature makes the fuel cell system more convenient to use.

Hereinafter, some modification examples of the fuel cell system according to the above embodiment will be described. In the above embodiment, the pressures detected by the pressure sensors disposed in the respective locations of the fuel cell system are used in the determination as to the presence/absence of a freeze related to the valves including the shut valve 21 and discharge valve 26. However, for example, the number of steps taken for opening the valve may alternatively be used for the same determination. FIG. 8 is a graph showing an increase of the number of steps taken for opening the valve (will be simply referred to as "step number" where appropriate) under each state when the maximum opening of the valve corresponds to step 5. In FIG. 8, the solid line represents an increase of the step number during a normal state (i.e., non-frozen state), while the dotted line represents an increase of the step number during a frozen state. Referring to the graph, the step number increases up to step 5 one by one during a normal state. In contrast, during a frozen state, the step number stops increasing before reaching step 5, for example at step 2 as shown FIG. 8. This indicates that the valve is frozen, and it thus cannot be opened any more. In this way, it is possible to easily determine the presence or absence of a freeze by referring to the step number of the valve.

In the above embodiment, when only the discharge valve 26 is frozen, the fuel cell system is started, and the discharge valve 26 is defrosted using the power and/or heat generated during the power generation by the fuel cell system. In another embodiment, a battery may additionally or alternatively be used for the defrost.

Also, in the above embodiment, it is determined in step S20 whether only the discharge valve 26 is frozen. But this determination is not necessarily made in another embodiment. That is, the start of the fuel cell system may be prohibited irrespective of which component or portion of the fuel cell system is frozen. In this case, the heater may be omitted from the fuel cell system.

Also, in the above embodiment, a message (i.e., information) regarding the execution of defrost is provided to the user via the display during the defrost. In another embodiment, such information may be given to the user through an audio indication, such as voice message, instead.

Also, in another embodiment, the freeze determination processes in step S13 may be executed in a different order from that shown in the table. Also, all these processes are not necessarily executed, namely only selected one or more of them may be executed.

Also, the start of the fuel cell system may be prohibited also when an abnormality is detected with the current value of the sensor or the motor for the valve, independent of the presence or absence of a freeze in the fuel cell system.

While the present invention has been described in detail with reference to exemplary embodiments thereof, it is to be understood that the present invention is not limited to the exemplary embodiments or constructions. To the contrary, the present invention is intended to cover various modifications and equivalent arrangements within the scope of the present invention. For example, the above-described control of the fuel cell system may by effected in the form of, not only a software algorithm, but also a specific configuration of hardware components and devices.

What is claimed is:

1. A fuel cell system, comprising:
a fuel cell;
a gas supply-discharge portion for supplying the fuel cell with a gas used in the fuel cell;
a defroster that, when a predetermined portion of the gas supply-discharge portion is frozen, defrosts a portion of the fuel cell system;
a controller that determines the presence/absence of a freeze among specific portions or components of the fuel cell system including the gas supply-discharge portion, wherein a freeze in the gas supply-discharge portion is detected by the controller before starting operation of the fuel cell system;
a discharge valve disposed in the gas supply-discharge portion to discharge the gas that has passed through the fuel cell;
at least one temperature detector for detecting a temperature in at least one of portions or components of the fuel cell system; and
a pressure detector for detecting a pressure adjacent the discharge valve, wherein
the controller determines the presence/absence of the freeze among specific portions or components of the fuel cell system including the gas supply-discharge portion and the discharge valve, wherein, when a detected pressure increases when the discharge valve is operated and a detected temperature is below a predetermined reference value, the controller performs power generation to defrost the discharge valve.

2. The fuel cell system according to claim 1, wherein the detected pressure is measured upstream of the discharge valve and when the discharge valve is being closed.

3. The fuel cell system according to claim 1, wherein the detected pressure is measured upstream of the discharge valve and the detected pressure increases only partially as compared to a pressure increase that occurs when the discharge valve fully closes after being opened.

4. The fuel cell system according to claim 1, wherein, when it is determined that a detected pressure does not increase when the discharge valve is operated and a detected temperature is below a predetermined reference value, the controller performs power generation to defrost the discharge valve.

5. The fuel cell system according to claim 4, wherein the detected pressure is measured upstream of the discharge valve and when the discharge valve is being closed.

6. The fuel cell system according to claim 4, wherein the detected pressure is measured upstream of the discharge valve and the detected pressure minimally increases as compared to a pressure increase that occurs when the discharge valve fully closes after being opened.

7. The fuel cell system according to claim 1, wherein, when a detected pressure decreases when the discharge valve is operated and a detected temperature is below a predetermined reference value, the controller performs power generation to defrost the discharge valve.

8. The fuel cell system according to claim 7, wherein the detected pressure is measured upstream of the discharge valve and when the discharge valve is being opened.

9. The fuel cell system according to claim 7, wherein the detected pressure is measured upstream of the discharge valve and the detected pressure decreases only partially as compared to a pressure decrease that occurs when the discharge valve fully opens after being closed.

10. The fuel cell system according to claim 1, wherein, when it is determined that a detected pressure does not decrease when the discharge valve is operated and a detected temperature is below a predetermined reference value, the controller performs power generation to defrost the discharge valve.

11. The fuel cell system according to claim 10, wherein the detected pressure is measured upstream of the discharge valve and when the discharge valve is being opened.

12. The fuel cell system according to claim 10, wherein the detected pressure is measured upstream of the discharge valve and the detected pressure does not change when the discharge valve is being opened.

13. The fuel cell system according to claim 1, further comprising:
a detector for determining whether the gas discharge valve is frozen, wherein when it is determined that only the discharge valve is frozen and a detected temperature is below a predetermined reference value, the controller performs power generation to defrost the discharge valve.

14. The fuel cell system according to claim 13, wherein the detector is a pressure sensor located adjacent the discharge valve and the controller compares the detected pressure to a pressure change that would occur after the discharge valve is operated and fully closes or opens to determine whether the discharge valve is frozen or partially frozen.

15. The fuel cell system according to claim 13, wherein the detector includes a counter for counting a number of steps taken during operation of the discharge valve and the controller compares the counted steps to a normal number of steps that would occur after the discharge valve is operated and fully closes or opens to determine whether the discharge valve is frozen or partially frozen.

16. The fuel cell system according to claim 13, wherein the defroster is powered by the power generation from the fuel cell system.

17. The fuel cell system according to claim 13, further comprising a notifier for providing a user with at least one of information regarding the determination made by the controller as to the presence or absence of a freeze in the fuel cell system and information selected in accordance with a result of the same determination.

* * * * *